Feb. 6, 1951 U. C. HAREN 2,540,201
MANUFACTURE OF COMPOSITE SHEET MATERIAL
Filed Jan. 31, 1948 3 Sheets-Sheet 1

Inventor
Urban C. Haren
By
Att.

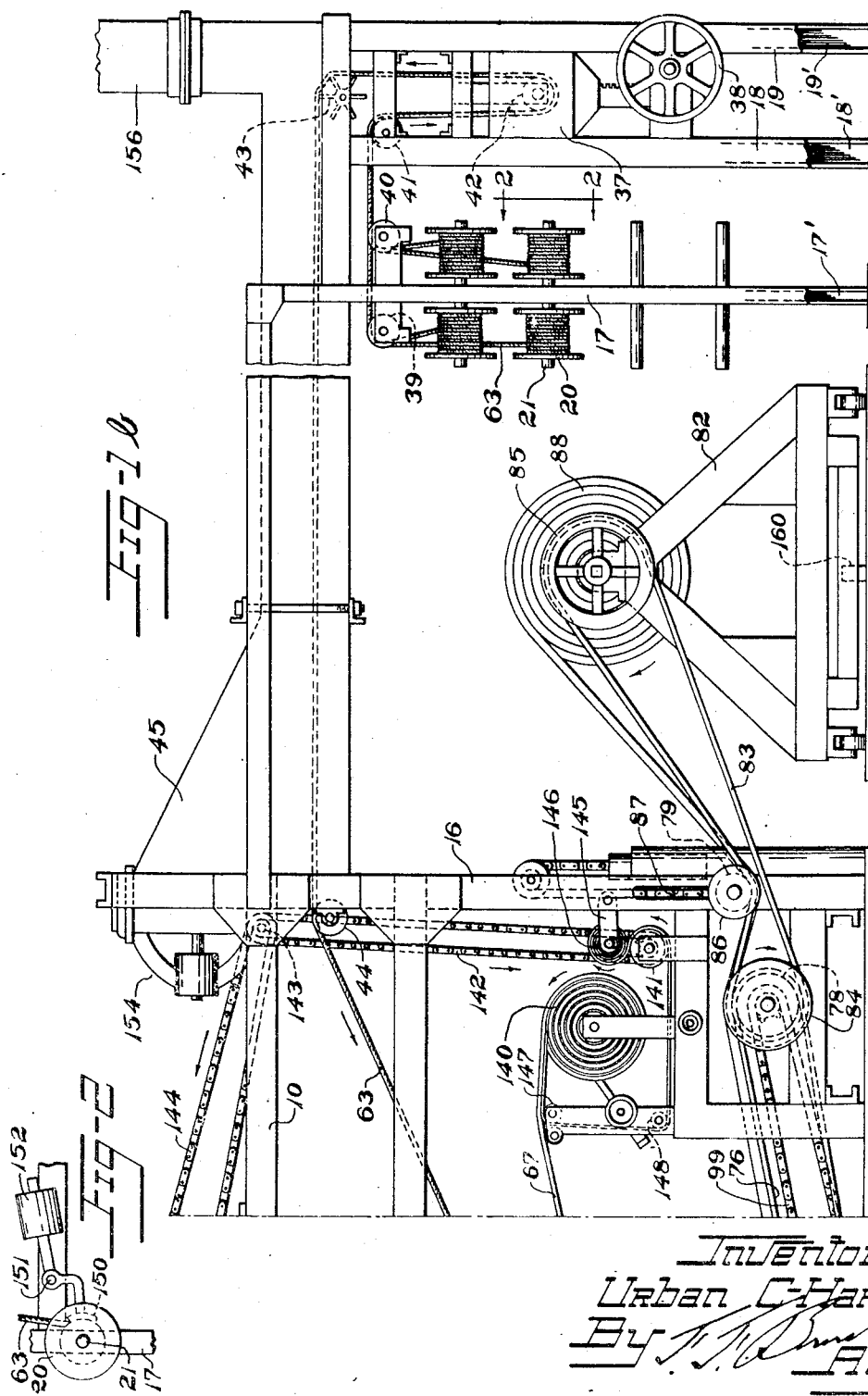

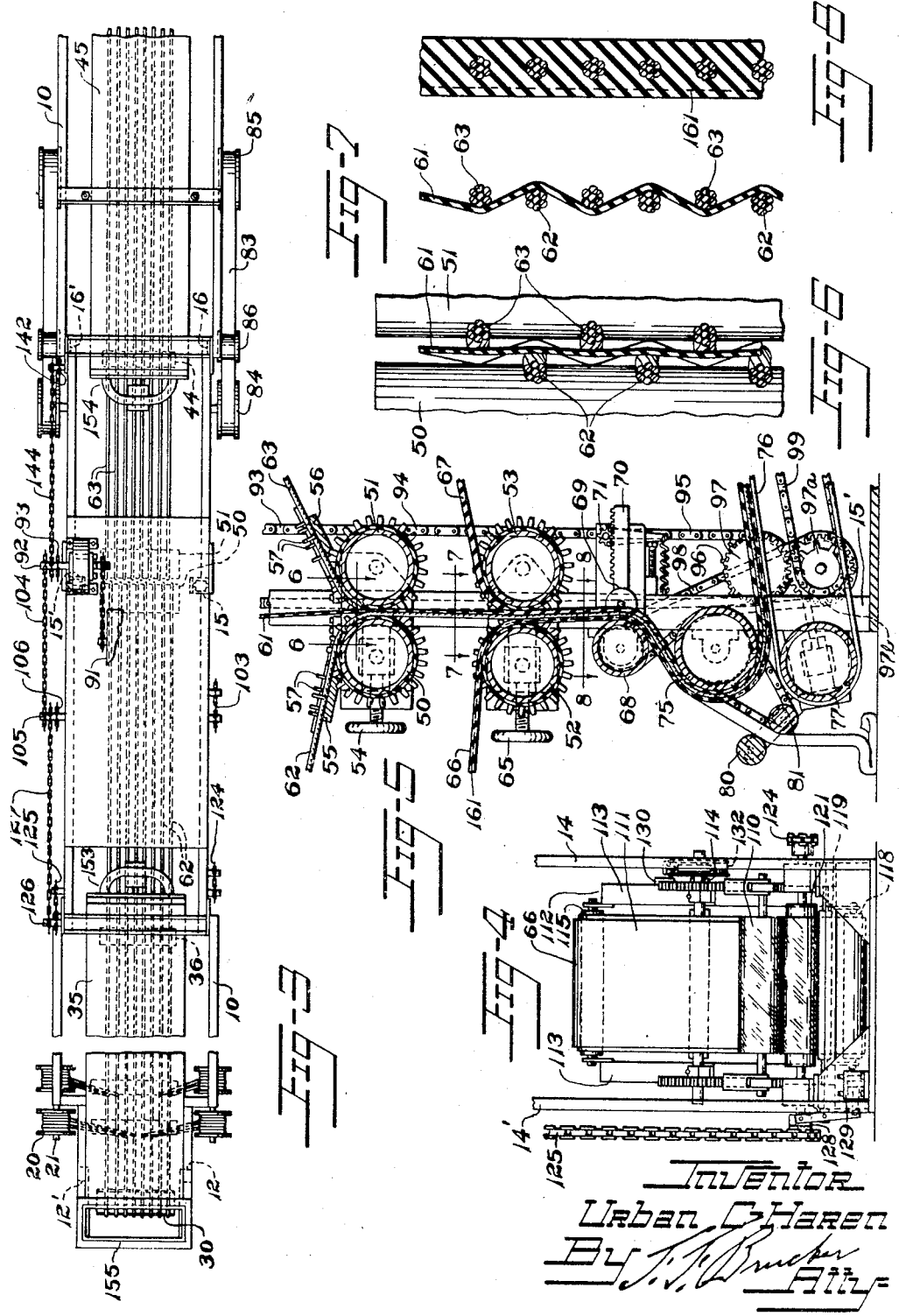

Patented Feb. 6, 1951

2,540,201

UNITED STATES PATENT OFFICE 2,540,201

MANUFACTURE OF COMPOSITE SHEET MATERIAL

Urban C. Haren, Akron, Ohio, assignor to The B. F. Goodrich Company, New York, N. Y., a corporation of New York Application January 31, 1948, Serial No. 5,552

9 Claims. (Cl. 154—1.75)

This invention relates to the manufacture of composite sheet material having parallel tension elements such as cords, wires, or cables arranged in a body of rubber or other rubber-like material, and is especially useful in the manufacture of belting.

Heretofore, where it was desired to incorporate a layer of cords, wires, or wire cables in a body of rubber or other rubber-like material, difficulty has been experienced in obtaining assembly of the cords or wires under uniform tension and uniform spacing and even transverse alignment at the desired depth in the body and in enclosing the cords or wires in intimate contact with the rubber-like material. This has been especially difficult in the case of wires or cables owing to their greater stiffness and low stretchability as compared to textile cords.

It is an object of the invention to overcome the foregoing and other difficulties.

Other objects are to provide for the manufacture of long lengths of belting reinforced with tension elements, to provide for uniform tension of the elements, to provide the desired transverse spacing of the elements, to provide separation of the tension elements from each other and thereby reduce internal friction, to provide good adhesion of the rubber-like material to the tension elements, and generally to provide economy and facility of manufacture.

These and other objects will appear from the following description and the accompanying drawings.

Of the drawings:

Figs. 1a and 1b show in continuation of each other a side elevation of apparatus constructed in accordance with and embodying the invention, parts being broken away.

Fig. 2 is a detail view of the windup mechanism, taken on line 2—2 of Fig. 1b.

Fig. 3 is a plan view of the apparatus of Figs. 1a and 1b, parts being broken away.

Fig. 4 is an end elevation thereof.

Fig. 5 is a sectional view of the assembling rollers.

Fig. 6 is a sectional view taken on line 6—6 of Fig. 5.

Fig. 7 is a sectional view taken on line 7—7 of Fig. 5.

Fig. 8 is a sectional view of the assembled material taken on line 8—8 of Fig. 5.

Figure 1A:
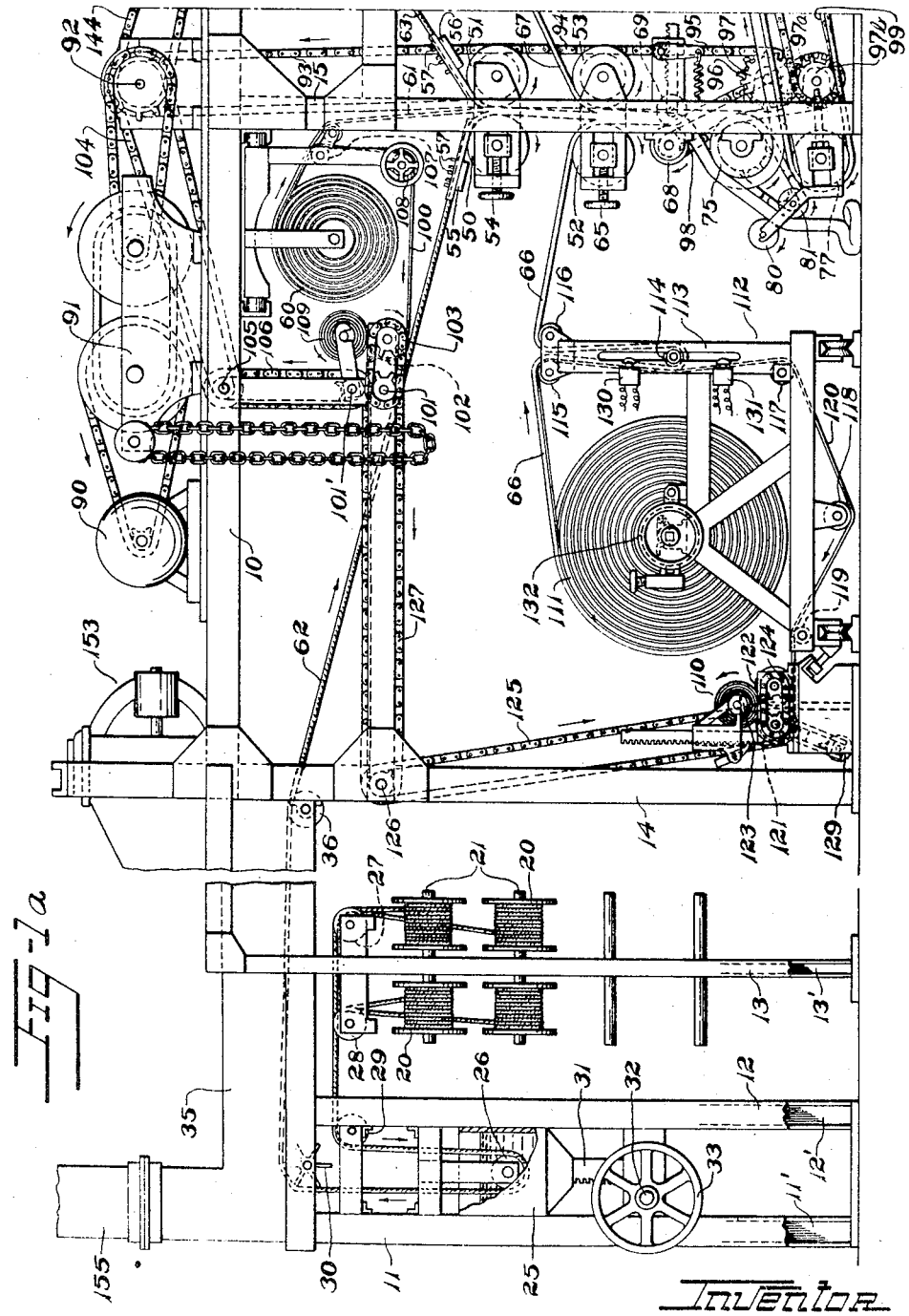

In accordance with the illustrative embodiment and practice of the invention, the tension elements are arranged in groups, preferably drawn from spools of individual tension elements arranged in creels, with the elements in each group spaced from each other by an amount substantially equal to twice the desired spacing in the finished article, the tension elements are coated with adhesive and dried, and the groups are brought into substantially the same plane with the elements of one group in intercalated relation with the elements of the other group while tension is maintained in each wire or cord. A sheet of rubber-like material is fed between the groups of elements as the elements are fed into the same plane provide rubber-like material between the elements separating them from contact with each other and holding them in properly spaced relation, and sheets including rubber-like material are adhered to opposite faces of the tension elements to enclose the elements.

Referring to the drawings, which illustrate apparatus for practicing the procedure of the invention, the numeral 10 designates a frame supported on stanchions 11, 11'; 12, 12'; 13, 13'; 14, 14'; 15, 15'; 16, 16'; 17, 17'; 18, 18'; 19 and 19'. Stanchions 13, 13' and 17, 17' support creel frames in which spools 20 of cord or wire are rotatably supported on pins 21. Stanchions 11, 11' and 12, 12' slidably support a dipping or coating tank 25, and a guide roller 26 is rotatably mounted on supports fixed to stanchions 11, 11'; 12, 12' for guiding the wires within the tank. The stanchions also rotatably support guide rollers 27, 28, 29 and 30 for guiding the wires from the creel to the tank and out of it in a single layer. A rack 31 depends from the tank and engages a pinion mounted on a shaft 32 rotatably journaled in the frame, whereby the tank, which contains rubber cement or other coating material, may be raised or lowered by a hand wheel 33.

A drying oven 35 is fixed to the framework, and the coated cords or wires are passed therethrough and about a roller 36 rotatably mounted on stanchions 14, 14'.

At the opposite end of the machine a similar coating tank 37 is slidably mounted on stanchions 18, 18', 19, 19' for manipulation by a hand wheel 38 and the wires from the creel or stanchions 17, 17' pass in a single layer about guide rollers 39, 40, 41, 42, 43, and 44 through an oven 45.

Mounted on the stanchions 15, 15' are a pair of opposed squeeze rollers 50, 51. Roller 50 is rotatably mounted in slidable bearings adjustable by hand screws 54 toward roller 51 which is rotatable in bearings on the stanchions. Comb boards 55, 56 are fixed to the stanchions and have pins 57 for guiding the wires into intercalated relation and to the nip of rollers 50, 51.

A roll 60 of sheet rubber-like material is suspended from frame 10 and the sheet material 61 is led between the two groups of tensioned cords or wires 62, 63 which are adhered to opposite sides thereof by pressure of the rubber-covered rollers 50, 51 as seen in Fig. 7, while the cords or wires are assembled in a common plane in intercalated relation with a layer of rubber-like material between each two adjacent cords or wires. The sheet material insures separation of the wires and holds them in properly spaced relation.

Mounted on the stanchions 15, 15' below the rollers 50, 51 are a second pair of squeeze rollers 52, 53 similar thereto. Roller 52 is adjustable toward roller 53, a hand wheel 65 being provided for this purpose. A sheet 66 of rubber-like material is provided and passes about roller 52 into contact with one face of the assembled cords or wires, and a second sheet 67 of rubber-like material is provided and passes about roller 53 into contact with the opposite face of the cords or wires and the assembly is squeezed together between the rollers 52, 53 to provide a solid slab as shown in Fig. 8.

For trimming the slab to width a driven roller 68 is rotatably mounted in bearings on stanchions 15, 15' and circular cutters 69 are mounted for adjustment axially of the roller 68 and toward and from it, as by holders 70 having rack teeth for engaging the pinion 71 of an adjusting shaft.

The trimmed slab travels about a roller 75 and is delivered over a conveyor belt 76 trained about rollers 77 and 78. The trimmed scrap is drawn away by rollers 80, 81.

As the slab leaves conveyor belt 76 it passes under a counterweighted roller 79 slidable vertically in slots 87 of stanchions 16, 16', and then to a windup reel 88, rotatably mounted on a carriage 82. A belt 83 engages about a sheave 84 on roller 78 and also about a sheave 85 on the reel 88, and a sheave 86 on roller 79 rests on the upper reach thereof. The arrangement is such that as the reel 88 increases its pulling speed due to increase in diameter of the material thereon, roller 79 is lifted in its slots by tightening of the reach of material and raises sheaves 86 permitting the belt 83 to slip.

For driving the squeeze rollers, a motor 90 is mounted on the frame 10 and drives a variable speed changer 91 which in turn drives a shaft 92. Shaft 92 and roller 51 are connected by a chain 93 and sprockets. A second chain 94 drives roller 53 from roller 51. Rollers 51 and 50 are geared together and rollers 52 and 53 are geared together. A chain 95 drives a sprocket 96 from roller 53. A gear 97 on sprocket 96 drives a gear 97a to which is fixed a sprocket 97b. Sprocket 97b drives a chain 98 which drives roller 68. A second sprocket on gear 97a (not shown) drives a chain 99 which drives roller 78.

A liner windup is provided to move the liner 100 from sheet material 61 as it passes to squeeze rolls 50, 51 from a stock roll 60. For this purpose, a roll 102 is driven by a chain 103 from a countershaft 101 which in turn is driven by a chain 106 from a countershaft 105. Countershaft 101 has a gear fixed thereto which is driven by a gear on a countershaft 101' which in turn is driven from countershaft 105 through chain 106 and suitable sprockets. Countershaft 105 is driven through chain 104 from shaft 92. The liner passes about a guide roller 107 and also about a roller 108 to roll 102 and thereabout to roll 109 where it is wound up.

A similar windup 110 is provided for receiving a liner in which the sheet 66 is interwound on a stock roll 111. The stock roll is supported for free rotation on a rail-wheeled carriage 112 which also has vertically slotted stanchions 113 for guiding a weighted roller 114. Guide rollers 115, 116 are rotatably journaled on the stanchions 113, and guide rollers 117, 118, 119, are journaled on carriage 112. The sheet material 66 with its liner 120 is drawn about roller 115 and under roller 114. At this point, the sheet material is separated from the liner and passes up over roll 116 while the liner is drawn downwardly about guide rolls 117, 118 and 119 to a pair of cradle rolls 121, 122 and onto a stock shell 123 resting thereon. Cradle rolls 121, 122 are connected by a chain 124, and roll 121 is driven by a chain 125, a countershaft 126, and a chain 127 from countershaft 101. A clutch 128 is interposed between chain 125 and roll 121. A pressure fluid operated cylinder 129 is provided to engage and disengage the clutch and is controlled by limit switches 130, 131 in the path of roll 114, see Fig. 1g. A band brake 132 is provided to frictionally retard rotation of stock roll 111. The arrangement is such that increased tension on the stock and liner caused by drag of the brake 132 and pull of the squeeze rollers 52, 53 causes roller 114 to rise in its slots and contact limit switch 130. This engages the clutch 128 to rewind the liner and pull the roll 114 downwardly. If the roll 114 descends too far it contacts limit switch 131 releasing clutch 128.

A liner windup is provided to remove the liner from sheet material 67 as it passes to the squeeze rollers 52, 53 from a stock roll 140. For this purpose, a roll 141 is driven by a chain 142 from a countershaft 143 which in turn is driven by a chain 144 from shaft 92. A pair of swing arms 145 retain a stock shell 146 which rests upon roll 141 and is driven thereby. Guide rolls 147, 148 guide the liner to the roll 141 about which it passes onto the stock shell 146.

Each spool 20 of wire or wire cable, as shown in Fig. 2 has an individual brake 150 fulcrumed on a pin 151. A weight 152 holds the brake shoe against the wire on the spool to tension it. By providing for individual tensioning of each wire, any slack is avoided and the tension of the belt is distributed uniformly among the wires.

The ovens 35, 45 for drying the cement coating on the wires are heated in any desired manner. Blowers 153, 154 are provided to circulate air therethrough and the heated gases escape through exhaust pipes 155, 156.

In operation, stock rolls of rubber-like material 60, 111 and 140 separated by liners are placed in position. Spools 20 of wire are placed on pins 4 and threaded through guides and about rolls as previously described. Cement or other coating material is placed in tanks 25, 37 and these are raised so as to submerge rollers 26, 42. Motor 90 is then started to progressively assemble the materials and wind the finished slab on the reel 82. This reel, for convenience in unloading, is rotatably mounted on a pin 160 so that when filled it may be turned about a vertical axis and the slab unwound therefrom. One or both of the sheets of rubber-like material 66, 67 may contain a layer 161 of fabric for strengthening the slab.

The rollers 50, 51, 52, 53 have a cushion rubber face so as to conform the rubber-like sheet material about the wires and are preferably adjusted so as not to deform the rubber material appreciably as the materials may be more closely compacted in a later pressing operation and displacement of the wires is avoided by using only slight pressure.

The provision of the sheet 61 of rubber-like material passing between adjacent wires insures full insulation of the wires from each other by rubber material.

Variations may be made without departing from the scope of the invention as it is defined by the following claims.

I claim:

1. The method of manufacturing a composite belt of rubber-like material and parallel reinforcing tension elements which comprises individually tensioning and assembling tension members in groups of spaced-apart parallel tension elements, progressively feeding the groups toward each other to a position where the elements of one group are in intercalated relation with the elements of the other group, feeding sheet rubber-like material between the groups at said position to space said elements and pressing all of said elements into adhesive engagement with said sheet at said position by application of pressure thereto in opposed directions.

2. The method of manufacturing a composite belt of rubber-like material and parallel reinforcing tension elements which comprises individually tensioning and assembling tension elements in groups of spaced-apart parallel tension elements in which the elements are spaced laterally in a plane by an amount equal to twice the desired spacing in the composite article, progressively feeding the groups toward each other to a position where the elements of one group are in intercalated relation with the elements of the other group, feeding sheet rubber-like material between the groups at said position, and pressing all of said elements into adhesive engagement with said sheet by application of pressure in opposed directions.

3. The method of manufacturing a composite belt of rubber-like material and parallel reinforcing tension elements which comprises individually tensioning and assembling tension elements in groups of parallel tension elements in which the elements are spaced laterally in a plane by an amount equal to twice the desired spacing in the composite article, progressively feeding the groups to a position where the elements of one group are in intercalated relation with the elements of the other group, simultaneously feeding an unvulcanized preformed sheet of rubber-like material between the groups and into adhesive relation thereto at said position, and adhering sheet rubber-like material to opposite faces of the composite material to enclose the tension elements by application of pressure in opposed directions.

4. The method of manufacturing a composite belt of rubber-like material and parallel reinforcing elements which comprises providing groups of spaced-apart parallel tension elements, individually tensioning each element to provide uniformity of tension to said groups, coating the elements with adhesion promoting material, progressively feeding the groups into the same plane with elements of one group in intercalated relation to the elements of the other group while the elements are under uniform tension, and simultaneously feeding sheet rubber-like material between the groups and into adhesive relation thereto.

5. The method of manufacturing a composite belt of rubber-like material and parallel reinforcing elements which comprises providing groups of parallel tension elements in which the elements are spaced laterally in a plane by an amount equal to twice the desired spacing in the composite article, individually tensioning each element to provide uniformity of tension in said groups, coating the elements, progressively feeding the groups into the same plane with elements of one group in intercalated relation to the elements of the other group while maintaining tension of the elements, simultaneously feeding sheet rubber-like material between the groups and into adhesive relation thereto, and adhering sheet rubber-like material to opposite faces of the tension elements.

6. Apparatus for manufacturing a composite belt of rubber-like material and parallel reinforcing tension elements extending therethrough, said apparatus comprising a support, spools of tension elements rotatably mounted thereon, said spools being arranged in groups, guiding means on said support for arranging the tension elements delivered by each group of spools in bands each of spaced-apart parallel elements from one of said groups of spools, means mounted on said support for delivering a sheet of rubber-like material progressively between a plurality of said bands of tension elements, roller means mounted on said support for pressing said tension elements of said bands and said rubber-like material into a composite band, and guide means mounted at said roll means for arranging the tension elements of one band of elements in intercalated relation to the elements of a second band at the position of assembly of the tension elements with said rubber-like material.

7. Apparatus for manufacturing a composite belt or rubber-like material and parallel reinforcing tension elements extending therethrough, said apparatus comprising a support, spools of tension elements rotatably mounted thereon, said spools being arranged in groups, guiding means on said support for arranging the tension elements delivered by a group of spools in bands each of spaced-apart parallel elements from one of said groups of spools, means mounted on said support for delivering a sheet of rubber-like material progressively between a plurality of said bands of tension elements, means on said support for delivering sheets of rubber-like material to opposite faces of the band of tension elements, roller means mounted on said support for pressing said tension elements of said bands and said rubber-like material into a composite band, and guide means mounted at said roll means for arranging the tension elements of one band of elements in intercalated relation to the elements of a second band at the position of assembly of the tension elements with said rubber-like material.

8. Apparatus for manufacturing a composite belt of rubber-like material and parallel reinforcing tension elements extending therethrough, said apparatus comprising a support, spools of tension elements rotatably mounted thereon, said spools being arranged in groups, means mounted on said support for coating said tension elements with an adhesive while said elements are withdrawn progressively from said spools, guiding means on said support for arranging the tension elements delivered by each group of spools in bands each of spaced-apart adhesive coated parallel elements from one of said groups of spools, means mounted on said support for delivering a sheet of rubber-like material progressively between a plurality of said bands of tension elements, means mounted on said support for delivering sheets of rubber-like material to opposite faces of the band of tension elements, roller means mounted on said support for pressing said tension elements of said bands and said rubber-like material into a composite band, and guide means mounted at said roll means for arranging the tension elements of one band of elements in intercalated relation to the elements of a second band at the position of assembly of the tension elements with said rubber-like material.

9. Apparatus for manufacturing a composite belt of rubber-like material and parallel reinforcing tension elements extending therethrough, said apparatus comprising a support, spools of tension elements rotatably mounted thereon, said spools being arranged in groups, guiding means on said support for arranging the tension elements delivered by each group of spools in bands each of spaced-apart parallel elements from one of said groups of spools, means mounted on said support in the path of said elements at said guiding means for coating said elements with adhesive material, means mounted on said support for drying the adhesive material on said elements, means mounted on said support for delivering a sheet of rubber-like material progressively between a plurality of said bands of tension elements, means mounted on said support for delivering sheets of rubber-like material to opposite faces of the band of tension elements, roller means mounted on said support for pressing said tension elements of said bands and said rubber-like material into a composite band, and guide means mounted at said roll means for arranging the tension elements of one band of elements in intercalated relation to the elements of a second band at the position of assembly of the tension elements with said rubber-like material.

URBAN C. HAREN.

REFERENCES CITED

The following references are of record in the file of this patent:

UNITED STATES PATENTS

| Number | Name | Date |
|---|---|---|
| 1,327,826 | Jameson | Jan. 13, 1920 |
| 1,544,217 | Castricum | June 30, 1925 |
| 1,619,191 | Castricum | Mar. 1, 1927 |
| 2,360,946 | Hershberger | Oct. 24, 1944 |
| 2,415,023 | Novotny | Jan. 28, 1947 |